July 18, 1961
H. A. BISHOP
2,992,673
METHOD AND MACHINE FOR MAKING CELLULAR STRUCTURES
Filed Oct. 13, 1958
5 Sheets-Sheet 1
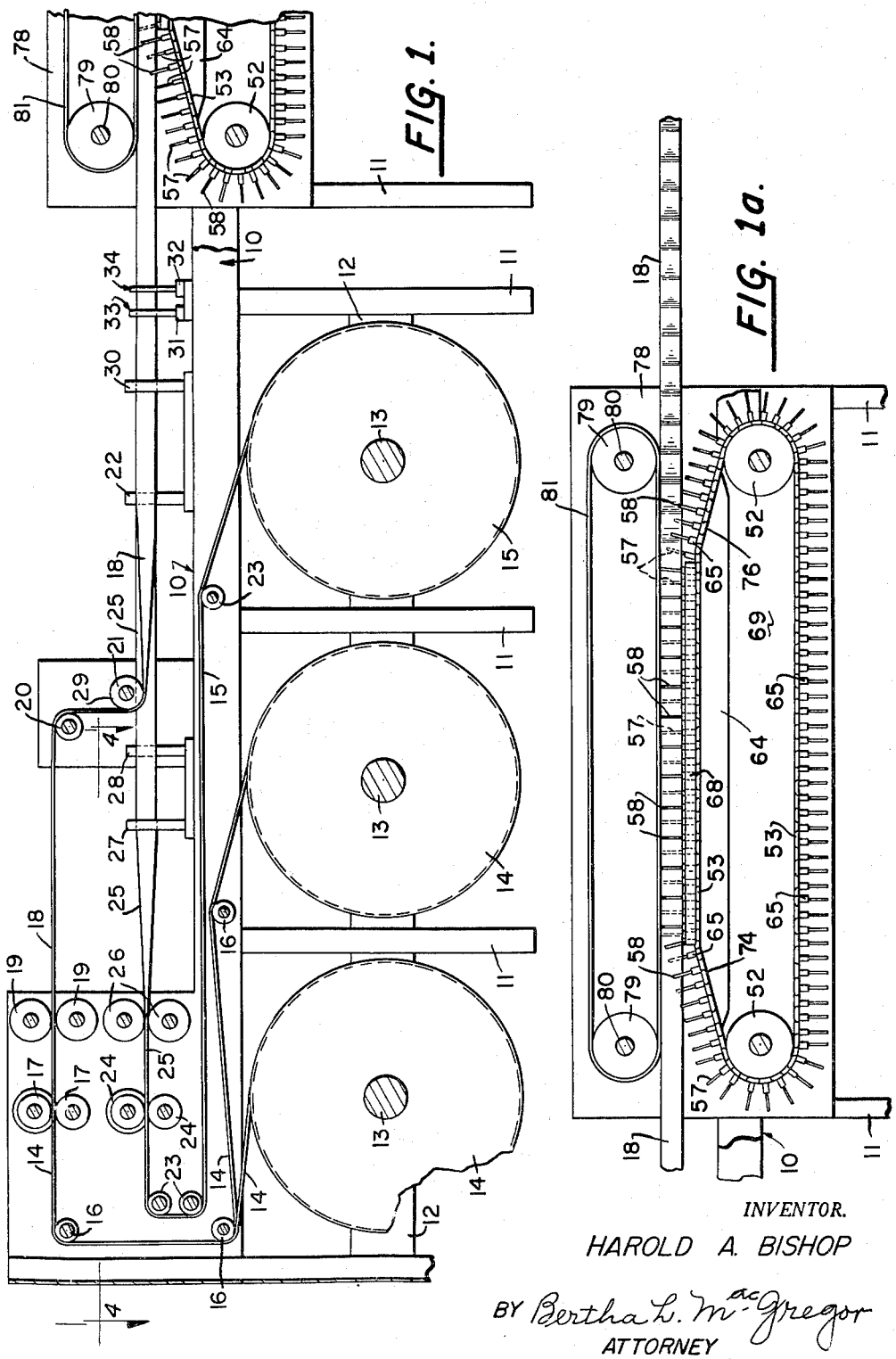
INVENTOR.
HAROLD A. BISHOP
BY Bertha L. M<sup>ac</sup>Gregor
ATTORNEY July 18, 1961
H. A. BISHOP
2,992,673
METHOD AND MACHINE FOR MAKING CELLULAR STRUCTURES
Filed Oct. 13, 1958
5 Sheets-Sheet 2
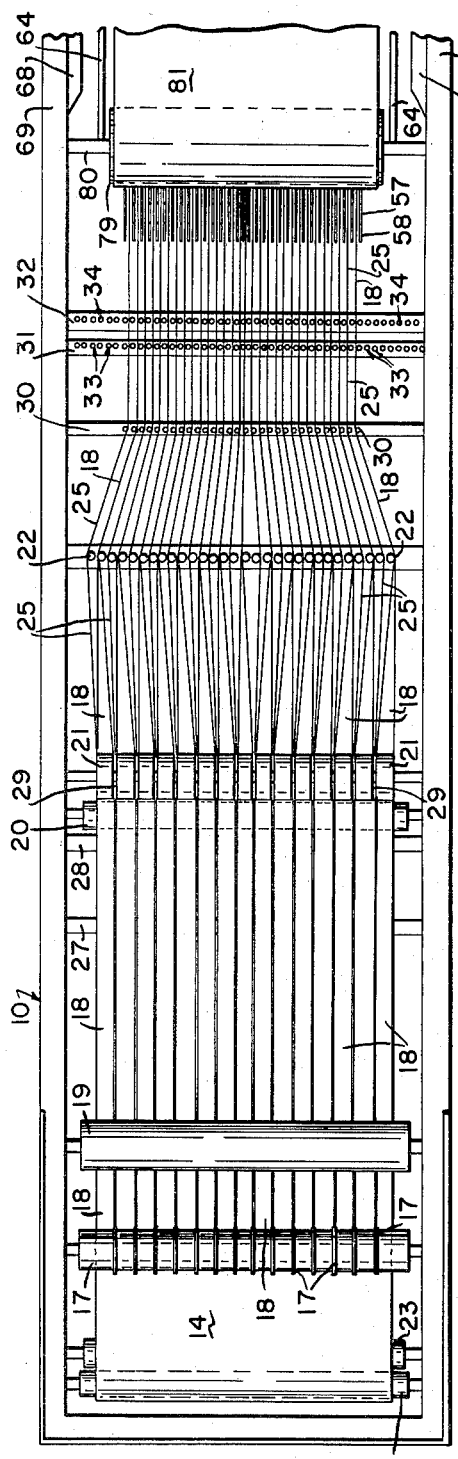
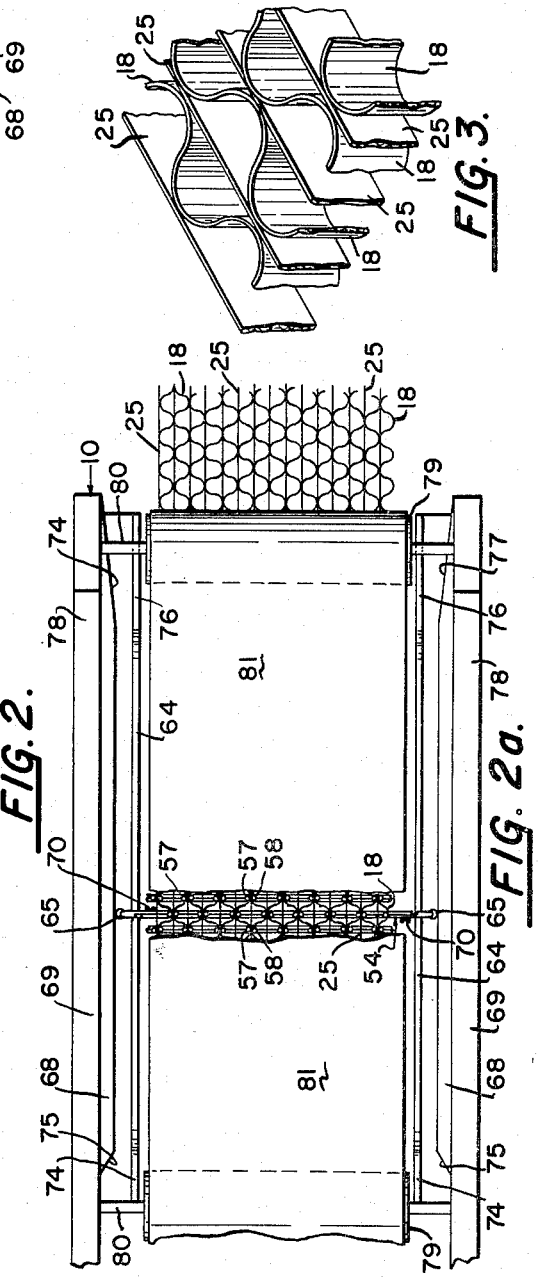
INVENTOR.
HAROLD A. BISHOP
BY Bertha L. MacGregor
ATTORNEY July 18, 1961      H. A. BISHOP      2,992,673
METHOD AND MACHINE FOR MAKING CELLULAR STRUCTURES
Filed Oct. 13, 1958      5 Sheets-Sheet 3

INVENTOR.
HAROLD A. BISHOP
BY Bertha L. MacGregor
ATTORNEY

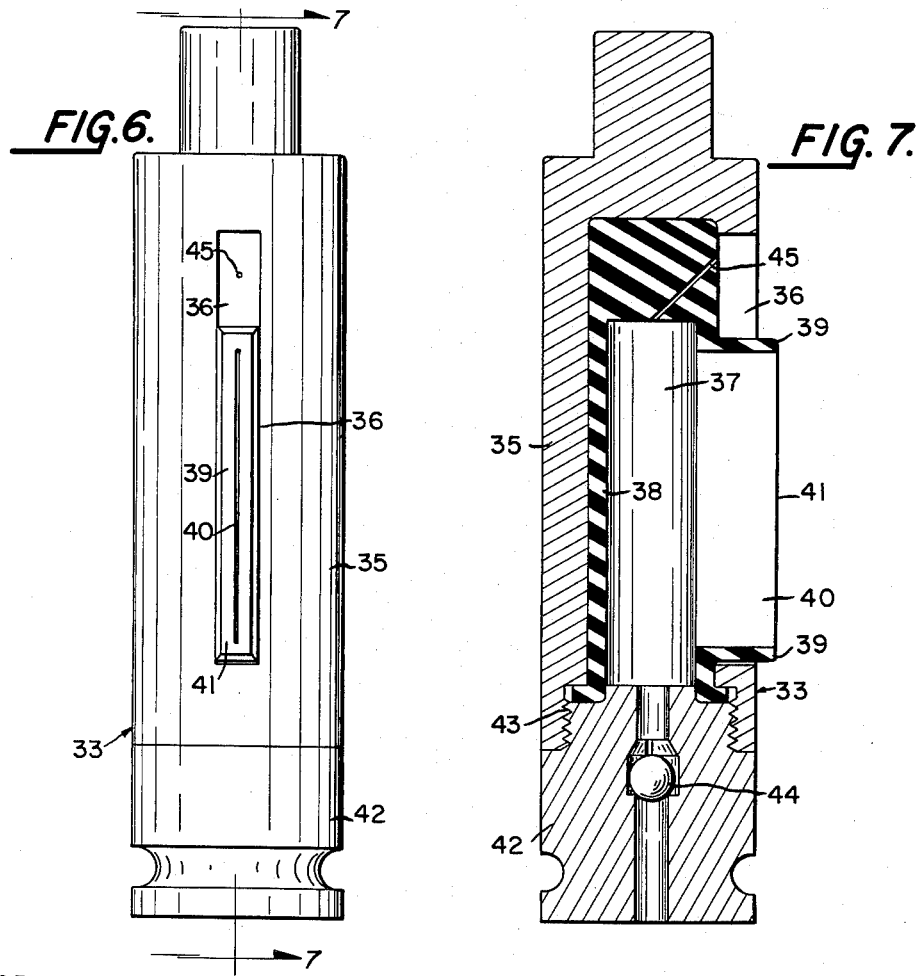

July 18, 1961 H. A. BISHOP 2,992,673
METHOD AND MACHINE FOR MAKING CELLULAR STRUCTURES
Filed Oct. 13, 1958 5 Sheets-Sheet 5

INVENTOR.
HAROLD A. BISHOP
BY Bertha L. MacGregor
ATTORNEY

United States Patent Office 2,992,673
Patented July 18, 1961

2,992,673
METHOD AND MACHINE FOR MAKING CELLULAR STRUCTURES
Harold A. Bishop, 4962 S. Galapago St., Englewood, Calif.
Filed Oct. 13, 1958, Ser. No. 766,845
17 Claims. (Cl. 154—1.6)

This invention relates to a method and machine for making cellular structures in the form of boards, sometimes described as honeycomb cores, in which the axes of the cells are at right angles to the major surfaces of the boards. Such structures are made of paper or other light weight material for use in aircraft and other construction. Sheets of the material are cut into parallel strips of equal width, and after having been turned on edge, alternate strips are shaped into corrugations or undulations and the alternating flat and undulating strips are connected together by adhesive means.

The main object of my invention is to provide a method and machine whereby cellular structures of the character described, of superior durability, can be produced in a continuous operation, efficiently and economically.

Another object of the invention is to construct a cellular board in which the crowns of the corrugations of one strip support the crowns of the corrugations of an adjacent undulated strip. In other words, the left facing crowns of an intermediate corrugated strip are laterally opposite the right facing crowns of the adjacent left hand corrugated strip, with a flat strip between them, and the right facing crowns of said intermediate corrugated strip are opposite the left facing crowns of the adjacent right hand corrugated strip, with a flat strip between them. Thus each area of connection of strips in my cellular construction includes three thicknesses of material, namely, the facing crowns of undulations of two strips and the flat strip between them. In constructions where the crowns of transversely aligned undulations are alternately facing all to the right or all to the left, each area of connection between strips includes only two thicknesses of material, namely, the crown of one undulation and the adjacent flat strip. The product produced by my new machine is substantially stronger and resistant to lateral stresses and distortion than are prior art structures.

Another object is to achieve a substantial savings in cost of the adhesive material required for connecting the strips together to form a durable core. By my machine, the adhesive is applied only to the flat strip and confined to the area which contacts the crowns of adjacent undulating strips.

Another object is to provide a machine for producing cellular cores of the character described in which the flat and the undulated strips may be cut from the same or different sheets of paper or other suitable material. Usually it is desirable to employ material of greater weight and thickness to form the undulating strips than is used for making the flat strips.

One of the novel features of my invention is an endless conveyor which carries the undulation forming and strip connecting means and brings said means into and out of operative positions relatively to the traveling strips without detachment of the said forming and connecting means from the conveyor.

Other objects and advantages will be apparent from the drawings and following description.

In the drawings:

FIG. 1 is a front elevational view partly in section, of the left hand portion of a machine embodying my invention, and FIG. 1a is a continuation of the same showing the right hand portion of the machine.

FIG. 2 is a top plan view of that portion of the machine shown in FIG. 1, and FIG. 2a is a top plan view of the portion shown in FIG. 1a.

FIG. 3 is a perspective view of a portion of a cellular board produced by the machine embodying my invention.

FIG. 6 is a side elevational view on an enlarged scale of one of the adhesive applicators.

FIG. 7 is a vertical sectional view in the plane of the line 7—7 of FIG. 6.

FIG. 10 is a diagrammatic plan view showing the undulation forming means in the "open" or non-operative positions between parallel strips and FIG. 11 shows the same after said means have been moved to "closed" or operative positions, and undulations have been formed in alternate strips.

Figure 4:
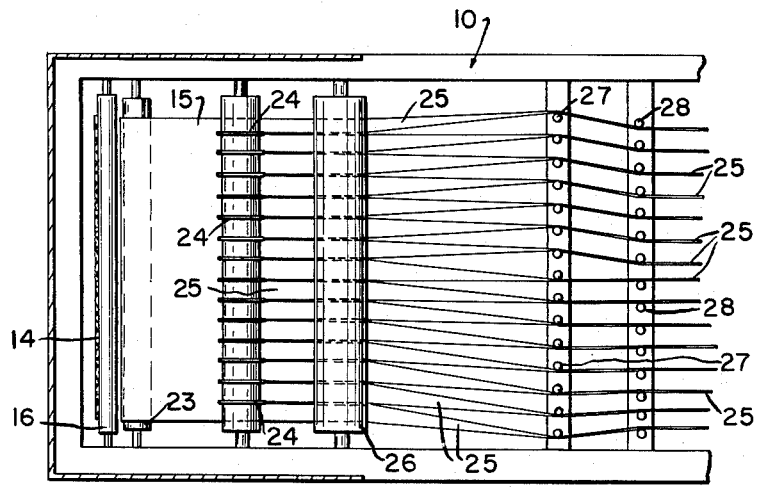
FIG. 4 is a horizontal sectional view in the plane of the line 4—4 of FIG. 1, looking downwardly as indicated by the arrows.

In that embodiment of my invention shown in the drawings, the bed 10 of the machine is supported on legs 11 to which are connected frame members 12. Three rolls of paper are rotatably mounted on shafts 13 mounted between frame members 12. Because the corrugated strips require more material than the flat strips, two rolls of paper 14 are provided to be slit into strips intended to be corrugated, and one roll of paper 15 is provided to be slit into strips which remain flat. Usually it is desirable to make the corrugated strips of material heavier and thicker than the flat strips, and therefore separate rolls 14 and 15 are provided, but if the strips forming the cellular structure are all of the same weight of material, separate rolls of material and separate strip cutters are not required.

Sheet material from a roll 14 is fed over rollers 16 and between cutters 17 which slit the sheet 14 into strips 18. The strips travel between rolls 19, over roll 20, and downwardly beneath rolls 21, located axially in a plane lower than the rolls 19 and 20. As the horizontally disposed, parallel flat strips 18 move to the right from beneath rolls 21, they are turned on edge by passing between the guide members 22. The guides may be a row of vertically disposed pins appropriately spaced transversely of the machine to receive strips 18 between them, or the guides may be of other construction, as for example, vertically extending open top slots in a cross piece of suitable material.

It will be understood of course that when the machine is first put into operation, the paper strips are threaded through various guides and the forming means referred to hereinafter, whereby they are drawn from left to right of the machine as herein described.

While sheet material 14 is being cut into strips 18 and moved to the place of turning them on edge at the left of guides 22, material 15 is passed over rolls 23 between cutters 24 to slit the material into flat horizontally disposed strips 25 which then pass between rollers 26. The strips 25 are turned on edge as they travel from rollers 26 to guides 27 and 28 (FIGS. 1 and 4), which are located so that the strips 25 travel at the proper height to pass through the narrow spaces 29 between the sides of adjacent rollers 21 (FIG. 2).

By reference to FIGS. 1 and 2, it will be seen that the upper strips 18, later to be shaped into undulations or corrugations, are flat and horizontally disposed as they pass under the rolls 21, and the lower strips 25 which remain flat in the finished structure, have been turned on edge and are vertically disposed as they pass between the rolls 21. Thus each strip 25 is located adjacent to a strip 18 or between two strips 18 as the strips move to the right from rolls 21. Before the strips reach the guides 22, the horizontal strips 18 have been turned on edge, so that all the strips 18 and 25 are on edge and alternately arranged as they pass from guides 22 to guides 30.

As the on-edge alternated parallel strips 18 and 25 move to the right from the guides 30, they approach the adhesive applying members which are mounted on two transversely extending supports 31, 32 (FIG. 1). The two rows of adhesive applicators are indicated at 33, 34, as a whole, and are shown in detail in FIGS. 5, 6 and 7. The members 33 and 34 are alike.

Referring to FIGS. 6 and 7, an adhesive applicator 33 comprises a tubular casing 35 of metal or other suitable material, provided with a narrow vertically elongated slot 36 which communicates with the interior chamber 37. A rubber casing 38 fits within the hollow casing 35 and is provided with a radially extending wiper 39 which protrudes through the elongated slot 36 in the casing 35. The wiper 39 has an elongated slot 40 which extends from the interior 37 to the outer applicator surface 41. The slot 40 is as long as the width of the strip 25 so that the wiper applies adhesive to a predetermined area extending across the strip from one longitudinal edge to the other. The wiper 39 protrudes beyond the casing wall 35 and presents a flexible depressible wiper surface 41 to the strips 25 to which adhesive is to be applied. In the lower end fitting 42, detachably connected at 43 to the casing 35, is a ball check valve 44 which prevents adhesive material in the chamber 37 from leaking. An air vent is indicated at 45. The members 33 and 34 are rotatably mounted on the supports 31, 32.

Figure 5:
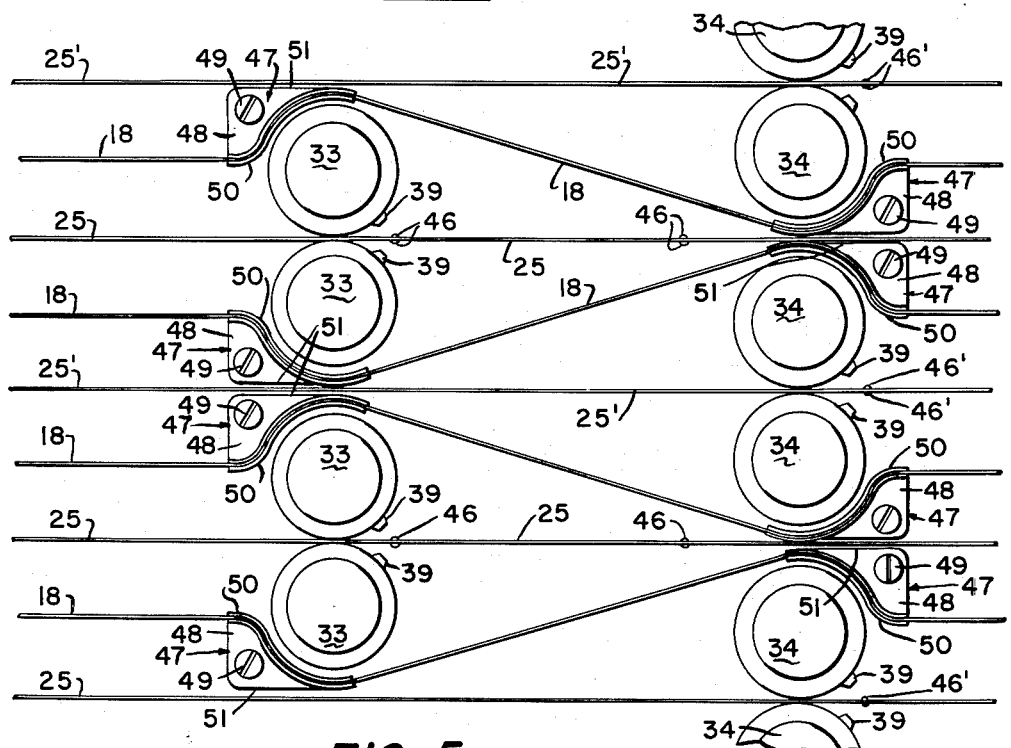
FIG. 5 is a top plan view, on an enlarged scale, of adhesive applying mechanism and strip guiding means.

By reference to FIG. 5, it will be seen that a pair of adhesive applicators 33 are arranged at opposite sides of a strip 25 so that the wipers 39 contact registering areas on opposite sides of the strip and apply adhesive to said areas 46. The distance between areas 46 is equal to the circumference of the casings 35 of the applicators. The casings 35 are designed as to circumference according to the desired predetermined size of the cells of the finished structure, or, in other words, the distance between the crowns of undulations to be formed in the strips 18. Pairs of adhesive applicators 34 function as described to apply adhesive to alternate strips 25 which are indicated in FIG. 5 at 25' to distinguish them from the strips 25 to which adhesive is applied by members 33. The areas on strips 25' to which adhesive has been applied by members 34 are indicated at 46', and they are spaced apart on each strip as determined by the circumference of the casings 35 of members 34, as heretofore explained.

As is apparent from FIG. 5, adhesive is applied only to opposite registering areas on the strips 25, which remain straight and flat in the finished product. In order to guide the strips 18 away from the adhesive applicators 33, 34, I provide guide members termed diverters herein to distinguish them from other guide members. The diverters 47 have flat horizontal upper and lower surfaces 48 fastened at 49 to any suitable support, and strip diverting curved walls 50 which are curved in horizontal planes and straight in vertical planes. The walls 50 may be double ply to provide a strip channel between them or single ply and slotted to have the strips 25 threaded therethrough. The diverters 47 are located adjacent to but spaced from the adhesive applicators 33, 34, so that each curved wall 50 guides a strip 18 from its straight incoming path at the left of FIG. 5 to a curved path surrounding but spaced from one side of an applicator 33, to a diagonal path between applicator 33 and 34, to the curved wall 50 of another diverter 47 around but spaced from one side of an applicator 34, and then to the exit path at the right of FIG. 5 in alignment with the incoming path of that strip 18. The straight vertical walls 51 of the diverters, opposite the curved walls 50, permit the strips 25 to travel in straight parallel paths between the applicators and between said walls 51 of adjacent pairs of diverters. When the strips 25 and 18 emerge from the adhesive applying zone, they are on edge, alternated and parallel, as they were when they entered this zone.

Figure 9:
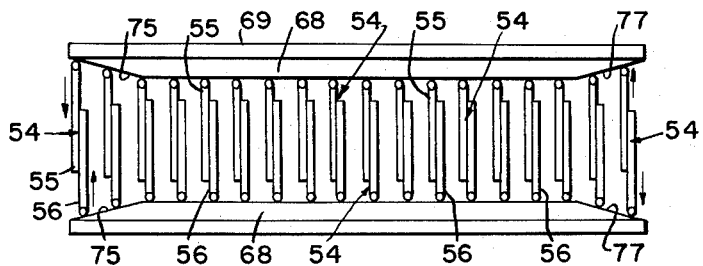
FIG. 9 is a diagrammatic plan view of the endless conveyor and undulation forming and strip connecting means thereon.

At the right of the machine, beyond the adhesive applying mechanism, is an endless conveyor shown in FIGS. 1a and 2a, and diagrammatically in FIG. 9. The conveyor drive means 52, driven by any suitable source of power, are rotated in clockwise direction and support the endless conveyor 53 which carries means for forming undulations in the strips 18 and for connecting strips 25 and 18 into a cellular structure.

Figure 8:
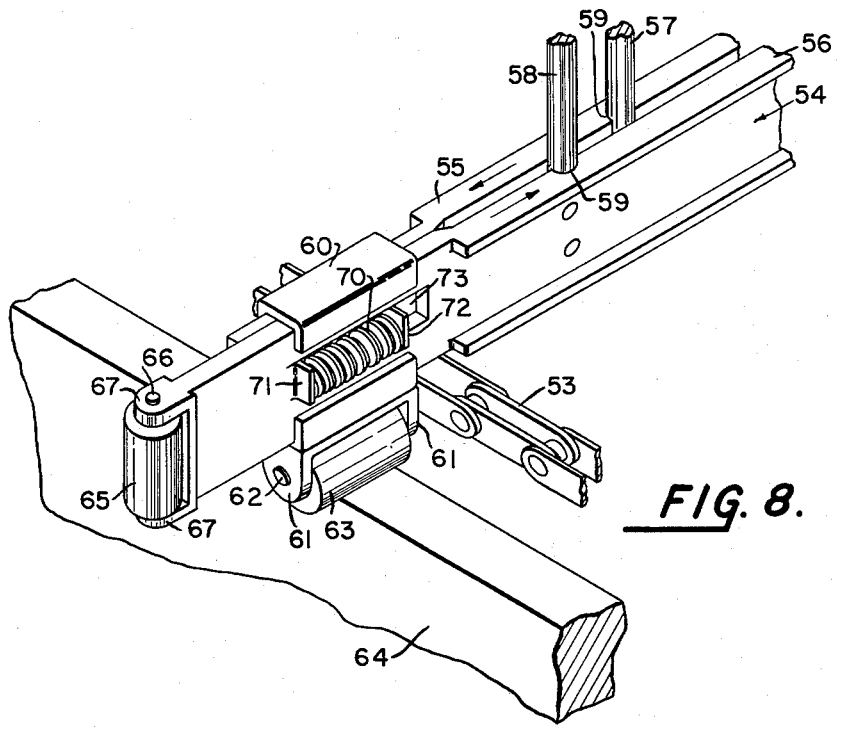
FIG. 8 is a perspective view of part of undulation forming and strip connecting means.

Extending transversely of the conveyor 53 are numerous equally spaced dual bar units indicated as a whole at 54, part of one of which is shown in FIG. 8. Each bar unit 54 comprises two bars, 55, 56, movable longitudinally relatively to each other, transversely of the conveyor 53. The bar 55 has fastened thereto a series of pins 57, and the bar 56 has fastened thereto a series of pins 58. The pins 57 and 58 are attached to the proximate spaced apart faces of the bars 55, 56, which are recessed as indicated at 59 in FIG. 8 to accommodate the rounded surfaces of the pins and permit the alternating pins 57, 58 to be bodily in alignment, transversely of the conveyor, in the space between the two bars 55, 56. End portions of the bars 55, 56 contact each other and are retained in slidable relationship by clamps 60. Each clamp 60 has depending ears 61 in which is mounted a shaft 62 for a roller 63 which rolls on a cam 64 located beneath the upper run of the conveyor chain 53. On the vertical face of one end of the bar 56 is rotatably mounted a roller 65 by means of a shaft 66 journaled in upper and lower ears 67. The bar 55 has a similar roller 65 mounted on the vertical face of its end opposite the roller carrying end of bar 56. The rollers 65 on opposite ends of the bars 55 and 56 of a dual bar unit are designed to roll on and bear against side cams 68 mounted on side frames 69 located adjacent opposite sides of the conveyor 53.

As shown in FIGS. 2a and 9, when the dual bar units 54 have been moved by the conveyor to positions where the rollers 65 bear against the working faces of the cams 68, the bars 55 and 56 are moved in opposite directions as indicated by the arrows in FIG. 8, causing pairs of pins 57, 58, to move closer together. When the bar units have been moved by the conveyor to positions where the rollers 65 bear against the inclined faces of the cams 68, the bars 55, 56 of a bar unit 54 move relatively in the opposite directions whereby the pins 57, 58 of a pair are caused to separate and move away from each other under influence of the spring 70 retained between the ear 71 projecting from the outer side of bar 56 and the ear 72 projecting from the inner side of bar 55 through slot 73 in bar 56 as shown in FIG. 8.

As shown in FIG. 1a, the transversely extending pin carrying dual bar units 54 cover the entire conveyor 53. As the bar units 54 are moved from left to right with the upper run of the conveyor 53, the rollers 63 of units 54 move over the upwardly inclined portion 74 of cam 64, raising the bar units and pins thereon to a horizontal level determined by the straight working surface of the cam 64. At the time that a bar unit 54 as a whole is being raised by traveling over the upwardly inclined cam surface 74 of cam 64, the rollers 65 of bars 55, 56 begin to contact the inclined surfaces 75 of the side cams 68 at the left of the conveyor. At this stage, the strips 25 with adhesive thereon in spaced areas, and the intermediate strips 18 are in the on-edge parallel arrangement shown at the left of FIGS. 2 and 5, and in that arrangement move to the right to the zone above the conveyor 53. As the bar units 54 are moved to the right by the conveyor and raised gradually by the inclined cam surface 74, the pins 57, 58 enter the spaces between the strips.

At this point, the pins 57 and 58 are in "open," inoperative positions but gradually the effect of the end rollers 65 bearing on the inclined cam surfaces 75 of the side cams 68 causes the bars 55, 56 of a unit 54 to be pushed inwardly as indicated at the left of FIG. 9, and thereby causes the pins 57, 58, of each pair of the plurality of pairs of pins on the unit 54 to move toward each other to form undulations in two strips 18, and to move the crowns of the two undulations toward each other and into contact with the adehsive coated area on opposite sides of a strip 25 between said undulated strips 18. Thus the closing movement of the pins of the several pairs of pins on a bar unit 54 not only functions to form undulations in strips 18 and to move the crowns of the undulations into contact with the adhesive coated areas of strips 25, but also to hold the undulated strips and intermediate strips in contact with each other until the adhesive has become "set" and the three thicknesses of material have become firmly connected together at each point of connection.

The initial positions of the pins 57, 58, and the strips 18, 25, at the left end of the conveyor, are shown in FIG. 10, and the operative "closed" positions of the pins after they have moved to undulate the strips 18 and connect them to the strips 25, are shown in FIG. 11.

The lengths of the conveyor 53 and of the straight surfaces of the cams 64 and 68 are such that the pairs of pins 57, 58 are maintained in "closed" positions between the strips for the time required for setting of the adhesive and firm connection of the strips to adjacent strips. This result may be achieved without the use of heat by controlling the speed of travel of the conveyor or by making the said cam surfaces and the conveyor of required length, but the time of holding the pins in closed position may be shortened if the pins are heated and the "setting" time is thereby shortened. When a dual bar unit 54 has been carried by the conveyor 53 to near the right hand end of the conveyor, the rollers 63 pass from the straight surface of the cam 64 to the downwardly inclined surfaces 76 (FIG. 1a), and at that time the side rollers 65 on said units 54 reach the inclined surfaces 77 of the side cams 68 whereby the bars 55, 56 of the unit move as indicated by the arrows at the right hand side of FIG. 9 to separate or "open" the pairs of pins 57, 58 on the bar unit 54. While the bar unit 54 is moving downwardly on the inclined surfaces 76, the pins 57, 58 are gradually withdrawn from the strips 18 and 25 which have been shaped and connected together to form the cellular structure shown in perspective in FIG. 3, and in plan view on FIG. 2a.

The inclined surfaces 77 of the side cams 68 are shaped and located relatively to the downwardly inclined cam surface 76 of the supporting cam 64 so that the side cams function to allow relative movement outwardly of the bars 55, 56 of the units 54 and resultant separation of the pins 57, 58 of a pair before the conveyor moves downwardly over the inclined cam surface 76. In other words, the pins 57, 58 of a pair should be separated sufficiently to release them from contact with the undulated strips 18 before withdrawal of the pins from the cellular structure begins.

If the cellular structure formed by the described mechanism is composed of relatively narrow strips, the pins 57, 58 can be withdrawn as shown in the drawings without disturbing the finished structure. However, the mounting of the bar units 54 on the conveyor 53 is such that said units can tilt slightly longitudinally of the conveyor to facilitate removal of the pins from the cellular structure without contacting the cell walls and without disturbing the "set" relationship of the adhering strips 18, 25 in the finished product.

It will be understood that the dual bar units of my machine may be modified to form undulations and to connect undulated and flat strips in arrangements other than the preferred cellular structure shown herein, wherein facing crowns of two undulated intermediate strips adhere to the alternate adhesive treated strips and each crown therefore is supported by another crown as well as by the flat strip between them.

Changes may be made in details of construction and in the form and arrangement of parts shown herein without departing from the scope of the invention.

I claim:
1. The method of making a cellular structure in which the axes of the cells are at right angles to the major surfaces of the structure and the crowns of intermediate undulated strips face and support each other, which comprises the steps of turning flat strips of material on edge into laterally spaced apart relationship, moving the strips longitudinally, applying adhesive material to opposite registering spaced apart narrow areas only on alternate strips while they are moving longitudinally, simultaneously forming undulations in said intermediate strips and moving the crowns of undulations of two strips into registering facing positions in contact with the adhesive treated areas on opposite sides of an alternate strip, exerting pressure against the inner surfaces of said facing crowns and pressing them toward each other against said adhesive treated areas, maintaining said pressure until the contacting surfaces of two facing undulation crowns and the intermediate adhesive treated strip have become firmly united, and gradually withdrawing the pressure exerting means from the united strips while they are moving longitudinally.

2. The method of making a cellular structure in which the axes of the cells are at right angles to the major surfaces of the structure and the crowns of intermediate undulated strips face and support each other, which comprises the steps of turning flat strips of material on edge into laterally spaced apart relationship, moving the strips longitudinally, applying adhesive material to opposite registering spaced apart narrow areas only on alternate strips while they are moving longitudinally, diverting intermediate strips away from said alternate strips while adhesive material is being applied to the latter, simultaneously forming undulations in said intermediate strips and moving the crowns of undulations of two strips into registering facing positions in contact with the adhesive treated areas on opposite sides of an alternate strip, exerting pressure against the inner surfaces of said facing crowns and pressing them toward each other against said adhesive treated areas, maintaining said pressure until the contacting surfaces of two facing undulation crowns and the intermediate adhesive treated strip have become firmly united, and gradually withdrawing the pressure exerting means from the united strips while they are moving longitudinally.

3. A machine for making cellular structures comprising alternate flat strips and intermediate undulated strips of material connected together in which the axes of the cells are at right angles to the major surfaces of the structure and the crowns of proximate undulated strips face and support each other, which comprises guiding means spacing a plurality of longitudinally moving strips turned on edge, adhesive applicators each provided with a narrow wiper contacting a narrow area on a strip and registering with a similar applicator wiper contacting the opposite side of the strip as the strip moves between them, an endless conveyor located to underlie the moving strips after they leave the applicators, undulation forming means mounted on the conveyor, said forming means including pairs of strip engaging members in which the members of a pair are aligned transversely of the conveyor and movable to and from each other in alignment transversely of the conveyor, means moving the conveyor longitudinally, means gradually moving the strip engaging members into spaces between the strips while the conveyor is moving longitudinally, bearing means adjacent the longitudinal sides of the conveyor contacting said forming means and moving the strip engaging members of a pair toward each other transversely of the conveyor, means on the forming members gradually moving the members of a pair apart transversely while the conveyor is moving longitudinally, and means gradually withdrawing said strip engaging members from the strips while the conveyor is moving longitudinally.

4. The machine defined by claim 3, which includes diverters located adjacent but spaced from the adhesive applicators, said diverters having strip engaging surfaces guiding the intermediate strips around the adhesive applicators without contacting the applicators.

5. The machine defined by claim 3, in which each adhesive applicator comprises a hollow casing provided with an elongated vertically disposed slot at one side through which the wiper protrudes and communicates with the hollow interior of the casing, the wiper having a narrow elongated vertically disposed slot equal in length to the width of the strip contacted by the wiper.

6. The machine defined by claim 3, in which the adhesive applicators are arranged in two rows extending transversely of the machine, and the applicators of each row are arranged in pairs to contact opposite registering areas on a strip, the pairs of applicators of one row being staggered with respect to the pairs of applicators of the other row.

7. The machine defined by claim 3, in which the undulation forming means are pin carrying bars arranged in pairs, slidable relatively to each other, and include a clamp holding the bars of a pair in sliding relationship.

8. The machine defined by claim 3, in which the undulation forming means including a plurality of members aligned in one plane are pin carrying bars and means connecting a pair of bars in sliding relationship relatively to each other, and in which the means on the forming members gradually moving the members of a pair apart comprise an ear projecting from one of the bars, a slot in said bar, an ear projecting from the other bar through said slot, and a spring bearing against said ears.

9. The machine defined by claim 3, in which the bearing means adjacent the longitudinal sides of the conveyor contacting the forming means and moving the members of a pair toward each other, comprise cam surfaces inclined at opposite ends and having an intermediate flat surface.

10. The machine defined by claim 3, in which the means gradually moving the undulation forming members into spaces between the strips and the means gradually withdrawing said forming means from the strips comprise cam surfaces upwardly inclined at one end of the conveyor in the direction of travel of the conveyor, and downwardly inclined at the opposite side from an intermediate flat surface traversed by the undulation forming means.

11. In a machine for making cellular structures comprising alternate flat strips and intermediate undulated strips of material connected together in which the axes of the cells are at right angles to the major surfaces of the structures and the crowns of proximate undulated strips face and support each other, the improvement which comprises an endless conveyor, undulation forming means mounted on the conveyor, means moving the conveyor longitudinally, said forming means comprising a plurality of bar units each including two bars relatively slidable transversely of the conveyor, pins mounted in the proximate faces of said bars of a unit in staggered relation aligned transversely of the conveyor, means imparting sliding movement to the bars of a unit simultaneously in opposite directions, and means adjacent the conveyor gradually successively raising and lowering the bar units while the conveyor is traveling.

12. The improvement defined by claim 11, in which the means gradually raising and lowering the bar units comprises a longitudinally extending cam having end surfaces inclined in the direction of travel of the conveyor and an elongated intermediate flat surface on which the bar units are successively supported as they are carried thereover by the moving conveyor.

13. The improvement defined by claim 11, in which the means gradually raising and lowering the bar units comprises a longitudinally extending cam having end surfaces inclined in the direction of travel of the conveyor and an elongated intermediate flat surface, and rollers on the bar units contacting said cam surfaces as the bar units are carried thereover by the moving conveyor.

14. In a machine for making cellular structures comprising strips of material connected together in which the axes of the cells are at right angles to the major surfaces of the structure, the improvement which comprises an endless conveyor having upper and lower runs trained over rotated driving means moving the conveyor longitudinally, undulation forming means mounted in uniformly spaced relationship on the conveyor throughout its length and fixed relatively to the conveyor longitudinally thereof to travel continuously therewith, said forming means including a plurality of pin bars slidable transversely of the conveyor, means located at opposite sides of the conveyor imparting sliding movements to said bars while the conveyor is traveling, means adjacent one end of the conveyor gradually raising the pin bars in a continuous gradually upwardly inclined plane, and means adjacent the other end of the conveyor gradually lowering the pin bars in a continuous gradually downwardly inclined plane.

15. In a machine for making cellular structures comprising strips of material connected together in which the axes of the cells are at right angles to the major surfaces of the structure, the improvement which comprises an endless conveyor having upper and lower runs trained over rotated driving means moving the conveyor longitudinally, undulation forming means mounted in uniformly spaced relationship on the conveyor throughout its length and fixed relatively to the conveyor longitudinally thereof to travel continuously therewith, said forming means including a plurality of pin bars slidable transversely of the conveyor, means located at opposite sides of the conveyor imparting sliding movements to said bars while the conveyor is traveling, means adjacent one end of the conveyor gradually raising the pin bars in a continuous gradually upwardly inclined plane, and means adjacent the other end of the conveyor gradually lowering the pin bars in a continuous gradually downwardly inclined plane, said means for raising and lowering the pin bars comprising a longitudinally extending cam having end surfaces inclined in the direction of travel of the conveyor and an elongated intermediate flat surface on which the bars are successively supported as they are moved thereover by the conveyor.

16. In a machine for making cellular structures comprising strips of material connected together in which the axes of the cells are at right angles to the major surfaces of the structure, the improvement which comprises an endless conveyor having upper and lower runs trained over rotated drive means moving the conveyor longitudinally, undulation forming means mounted in uniformly spaced relationship on the conveyor throughout its length and fixed relatively to the conveyor longitudinally thereof to travel continuously therewith, said forming means including a plurality of pin bars slidable transversely of the conveyor, means located at opposite sides of the conveyor imparting sliding movements to said bars while the conveyor is traveling, means adjacent one end of the conveyor gradually raising the pin bars in a continuous gradually upwardly inclined plane, means adjacent the other end of the conveyor gradually lowering the pin bars in a continuous gradually downwardly inclined plane, a roller having a vertical axis mounted on each pin bar for contact with the means for imparting sliding movements to said bars, and a roller having a horizontal axis mounted on each pin bar for engaging the pin bar raising and lowering means.

17. A machine for making cellular structures comprising alternate flat adhesive treated strips and intermediate untreated undulated strips of material connected together in which the axes of the cells are at right angles to the major surfaces of the structure and the crowns of proximate undulated strips face and support each other, which comprises guiding means spacing a plurality of longitudinally moving strips turned on edge, adhesive applicators adjacent alternate strips, each applicator being provided with a narrow wiper contacting a narrow area on an alternate strip and registering with a similar applicator wiper contacting the opposite side of the strip as the strip moves between them, guiding means diverting the intermediate strips from the applicators, an endless conveyor located to underlie the moving strips after they pass the applicators, undulation forming means comprising a plurality of bars mounted in uniformly spaced relationship on the conveyor throughout its length and fixed relatively to the conveyor longitudinally thereof to travel continuously with the conveyor, undulation forming pins on the bars for engaging the intermediate strips and moving the crowns of undulations into contact with the adhesive treated areas of the alternate strips, means adjacent one end of the conveyor moving the undulation forming means in a continuous gradually upwardly inclined plane toward the moving strips and means adjacent the other end of the conveyor moving the forming means in a continuous gradually downwardly inclined plane away from the strips.

References Cited in the file of this patent
UNITED STATES PATENTS

| | | |
|---|---|---|
| 1,184,748 | Hicks | May 30, 1916 |
| 2,759,523 | Goldstein et al. | Aug. 21, 1956 |
| 2,769,481 | Meanor et al. | Nov. 6, 1956 |
| 2,919,467 | Mercer | Jan. 5, 1960 |

UNITED STATES PATENT OFFICE
CERTIFICATE OF CORRECTION

Patent No. 2,992,673                                      July 18, 1961

Harold A. Bishop

It is hereby certified that error appears in the above numbered patent requiring correction and that the said Letters Patent should read as corrected below.

In the grant, line 3, address of inventor, for "Englewood, California" read -- Englewood, Colorado --; in the heading to the printed specification, line 5, address of inventor, for "Englewood, Calif." read -- Englewood, Colo. --.

Signed and sealed this 5th day of December 1961.

(SEAL)
Attest:

ERNEST W. SWIDER                                             DAVID L. LADD
Attesting Officer                                          Commissioner of Patents

USCOMM-DC